United States Patent [19]

Ko

[11] Patent Number: 5,746,113
[45] Date of Patent: May 5, 1998

[54] INFUSION VESSEL

[76] Inventor: Lily Ko, 5438 Don Mateo Ct., San Jose, Calif. 95123

[21] Appl. No.: 572,884

[22] Filed: Dec. 18, 1995

Related U.S. Application Data

[63] Continuation-in-part of Ser. No. 489,055, Jun. 9, 1995, abandoned.

[51] Int. Cl.⁶ ............................. A47G 19/14; A47S 31/00
[52] U.S. Cl. ................................. 99/323; 99/317; 99/279
[58] Field of Search .............................. 99/279, 316, 317, 99/321, 322, 323; 426/433

[56] References Cited

U.S. PATENT DOCUMENTS

| 240,402 | 4/1881 | Gee | 99/322 |
|---|---|---|---|
| 814,460 | 3/1906 | Kruckewitt | 99/322 |
| 1,652,935 | 12/1927 | Goldfield | 99/317 |
| 1,748,297 | 2/1930 | Matson | 99/317 |
| 2,591,606 | 4/1952 | Reed | 99/316 |
| 3,657,994 | 4/1972 | Post | 99/323 |
| 4,948,601 | 8/1990 | Serbu | 99/323 |

FOREIGN PATENT DOCUMENTS

| 15992 | 10/1888 | United Kingdom | 99/322 |
|---|---|---|---|
| 7474 | 4/1893 | United Kingdom | 99/316 |

*Primary Examiner*—Reginald L. Alexander

[57] ABSTRACT

The invention relates to an infusion vessel, the vessel having a separate beverage containing chamber, an infusion chamber integrally formed along side of the beverage chamber, the infusion chamber being defined by a perforated wall which extends a distance within the beverage chamber and a closed bottom wall. An infusion product within the infusion chamber will be in fluid communication with the beverage chamber for the production of a beverage.

2 Claims, 4 Drawing Sheets

INFUSION VESSEL

This application is a continuation in part of application Ser. No. 08/489,055, filed on Jun. 9, 1995 previously filed now abandoned.

BACKGROUND OF THE INVENTION

1. Field of the Invention

The present invention relates generally to infusing devices, and more particularly, to devices designed to allow the convenient brewing of tea or other brew while reducing the amount of bitter tannins or other chemicals introduced into the brewed liquid after the initial infusing is completed.

2. Description of the Prior Art

The search for the perfect cup of tea is as old as recorded history. Early on, it was discovered that tea leaves and other substances could be introduced into drinking water to make it more palatable. The recent popularization of gourmet teas and the proliferation of boutique tea houses, however, pose new problems to the industry.

One problem is the excess of tannins produced in a cup of tea. Most traditional varieties of tea contain substantial amounts of tannin which is a soluble, astringent phenolic compound that imparts a bitter taste to tea. Although a certain concentration is desirable to add flavor to the tea, an excess of tannin gives an undesirable bitter flavor. More importantly, even a slight excess of tannin may serve to mask the subtle flavors the blender sought to evoke. Subtle differences in flavor, color, and aroma demand new methods of tea infusion so that they may be properly expressed. At the same time, the palate has become better educated and able to distinguish the subtle differences, and particularly, of the finer loose leaf blends.

The cause of the excess tannin problem lies in the traditional brewing process. A method of brewing tea simply involves placing the loose tea leaves in a cup. The tea continues to brew as long as there is water in the cup. Additionally, the user must cope with another problem of the free floating leaves.

Inadvertently, brewing methods that attempt to reduce the amount of tannin or control the free floating leaves pose another problem by increasing the labor process. Problems include the difficulty in preparation, serving, and maintenance of prior brewing devices. The multiple parts require disassembling and reassembling the device thus increasing labor, the moving parts may wear or become lost thereby decreasing efficiency, or the device needs to be removed from the container therefore causing drippage of liquid.

Tea may be placed inside the traditional tea bag, filter, or perforated metal strainer which is then placed in a cup, and then the device is removed to stop the brewing process. However, the user is then faced with the awkward problem of what to do with the dripping bag, filter, or strainer. In addition, tea bags and filters severely limit the flow of water around the tea, may introduce unwanted flavors and chemicals into the tea, may break in use, and may inhibit the evocation of flavor containing compounds. The perforated strainers are difficult to clean and maintain. They constitute a separate item for a tea shop to wash and may significantly complicate the serving of a proper cup of tea in a commercial setting. Additionally, the introduction of the individual serving coffee bag brings forth a new element sharing an old problem; that of regulating the strength of caffeine as teabags have with regulating tannin.

Pots with perforated compartments have been known since the 19th century. Indeed, pots with perforations between the main chamber and spout have been known. Also, Cole, Great Britain 7,474 of 1893 discloses a device whereby perforate strainer separates one chamber of the teapot from the other. Simpson, U.S. 90,790 of 1869 discloses a covered, two chambered teapot with the partition being perforated in the lower region. Bohman, U.S. Pat. No. 1,079,830 of 1913 discloses a covered, two chambered, semi-based teapot with the partition being perforate. Goldfield, U.S. Pat. No. 1,652,936 of 1927 discloses a cup with a shiftable cartridge insert. Matson, U.S. Pat. No. 1,748,297 of 1929 discloses a two chambered teapot with perforations in the bottom of the second elevated chamber. Reed, U.S. Pat. No. 2,591,606 of 1950 discloses a bottomless tea bag holder. More recently, Post, U.S. Pat. No. 3,657,994 of 1972 discloses a combination container and dispenser to be used within the cup. Finally, Jorgensen, U.S. Pat. No. 5,453,189 of 1995 discloses a plunger and filter assembly for use in a teapot to control the brewing time.

The problem with the teapot with perforations between the main chamber and spout is that the tea continues to infuse without control of tannin concentration. In addition, as the tea is dispensed, the loose leaves tend to collect at the spout base and clog the flow of liquid. The devices of Simpson and Bohman also continue to allow the tannin content to become concentrated. The device of Matson has holes at the bottom allowing the tannin rich liquor to continue dripping into the beverage. Another embodiment has no holes in the receptacle thereby limiting the use to only holding the teabag and not functioning in the act of brewing. In fact, Matson's device is defined for the purpose of holding the spent teabag to avoid dripping onto a tabletop. It should be noted that Cole acknowledges both the injurious effects of tannin and the fact that the concentration of tannin in a brew varies with the length of time of infusion. The device of Cole attempts to resolve the problem by providing holes throughout the partition to give free scope for rapid extraction of the desirable component of the leaves and by elevating the leaves from the water as the tea is decanted. However, the tannins continue to drip into the beverage. Also, the sloped underside of the chamber makes cleaning difficult. Clearly, the aforementioned patents establish a long felt need for a solution to the problem. The bottomless tea bag holder of Reed continues to allow the tannins to leach into the beverage, and cannot be used for loose leaf teas. Moreover, Reed's device must fit exactly onto the intended cup; being neither too narrow such that the holder cannot be attached, nor too loose such that the holder slides around or falls off when the cup is tilted. The container of Post has a solid bottom so that when the side apertures are shifted closed, the product's freshness may be maintained. The side apertures are simply placed around the side of the container, without any differentiation between the upper and lower regions of the perforate container sides. The device of Goldfield uses a cartridge that must be shifted and rotated in order to control the brew strength rather than employing a reservoir to do so, and attempts to eliminate the use of teabags so it is intended only for loose leaf teas. The device of Jorgensen makes use of a plunger with a rubber gasket. The presence of the gasket makes the device difficult to clean and introduces a tendency to absorb oils and other substances, thereby introducing unwanted flavors and odors upon subsequent use. The gasket may easily wear or leak and the multiplicity of parts increases the risk of loss or breakage. In a commercial setting, excess labor is required to disassemble and reassemble the pot, filter, and plunger assembly thus reducing the device's suitability for such uses.

The difficulty with all previous attempts to solve the tannin problem is that they fail to deal with the fact that the tannins continue to leach from the leaves for a considerable time after the desirable portions of the tea are expressed. This occurs as long as the leaves are wet. Furthermore, steam from the water below continues to heat the wet leaves above, gaining free access to the wet leaves through holes in the bottom and sides of the containers. The result is that a tannin rich liquor develops surrounding the leaves. This fact may be demonstrated by brewing tea using a conventional teabag, removing the bag from the cup and setting it aside. A sampling of the liquor expressed from the bag will show a high concentration of tannin and be bitter to the taste. The aforementioned inventions fail to solve the problem because while a strainer blocks the tea leaves or teabag from entering the beverage, it does not prevent liquid from flowing through the holes and in this liquid are the presence of the tannins. Additionally, the receptacle without holes as in Matson's device cannot brew the tea. In essence, the prior inventions teach away from the problem by providing a strainer with holes throughout and no reservoir to catch the tannin drippings and thereby allow the tannin rich liquor to mix with the intended beverage, either by allowing direct communication with the beverage, or by allowing the liquor to drip into the beverage, or by retaining the chemical in absorbent material inherent to the device. Further difficulties with all previous devices include adding labor in preparation, serving, or cleaning, or increasing the chances for breakage or loss of parts.

SUMMARY OF THE PRESENT INVENTION

It is therefore an object of the present invention to provide a means whereby the tannin or chemical content may be easily and confidently controlled.

It is another object of the invention to provide a means by which the brew may be easily prepared.

It is another object of the invention to provide a means by which the brew may be readily dispensed in either individual or multiple servings.

It is another object of the invention to be easy to clean. It is another object of the invention to be used for packaged or loose form infusing material. It is another object of the invention to be used as in the manner of a drinking cup or a pot or a dispenser. Incidentally, the invention may also be used for nonbrewing material and also to release aromatic compounds.

Briefly, in a preferred embodiment, the present invention comprises a conventional mug with a slight taper running from top to bottom. On one side of the cup an infusing chamber is placed. The infusing chamber does not extend the full length of the cup, but instead, ends a sufficient distance from the bottom of the cup to allow the bottom of one cup to fit securely within the upper, central section of another, like, cup. A flat bottomed handle is placed on the side of the cup to allow for easy stacking.

The infusion chamber wall has holes which communicate with the main chamber of the cup. The holes are of a size such that they retain the leaves but allow the ready passage of water so that infusing may take place. The holes do not, however, extend the full length of the infusion chamber. Instead, they extend only part way down the common wall between the chambers. As the tea is used, the water level drops below the level of the holes in the common wall. The wet tea leaves are retained within the reservoir of the infusion chamber below the level of the holes. The majority of the tannin rich liquor is also retained within the infusion chamber as it develops. Although a small amount of the liquor may enter the main chamber as the cup is tilted, the majority of it will be retained within the chamber due to the mechanical damming effect of the leaves themselves and of the reduction of the water level in the infusion chamber. Additionally, a small lip may be added on the interior side of the second chamber to further help retain the tannin rich liquor. Thus, the presence of a strainer combined with a reservoir produces a synergistic effect that allows passage of liquid in addition to collecting the tea leaves and tannin liquor, thereby preventing the tannin liquor from contaminating the desired liquid tea.

The tea may be introduced into the infusion chamber by a number of means; it may be introduced in loose leaf form, teabag, or by an insertable cartridge. Alternately, the cartridge may consist of the second chamber in its entirety, with the cartridge having all of the features of the infusion chamber but fitting within an aperture in the wall of the first chamber if the second chamber is external to the first chamber. In either internal or external variation, the cartridge may be retained by means of a clip, opposing grooves, a dovetail joint, or any one of a number of means.

Variations of the above include placing the infusion chamber within the main chamber and the addition of a screen or membrane in place of the aforementioned lip.

These and other advantages of the present invention will no doubt become obvious to those of ordinary skill in the art after having read the following detailed description of the preferred embodiment which is illustrated in the various drawing figures.

IN THE DRAWINGS

DETAILED DESCRIPTION OF THE PREFERRED EMBODIMENT

Figure 1:
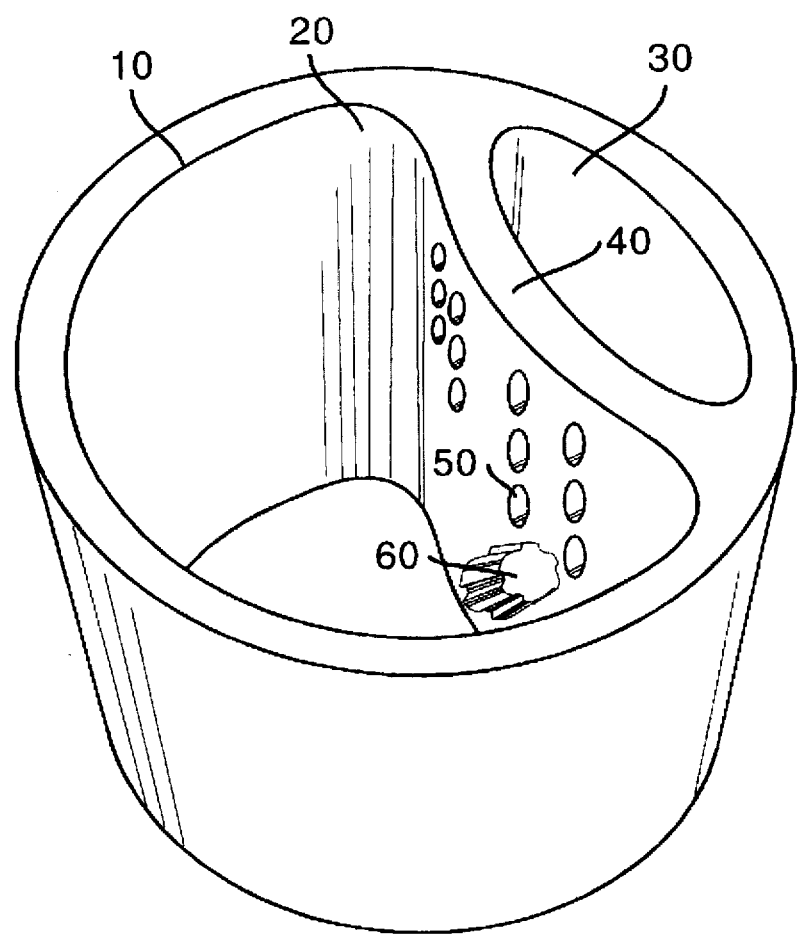
FIG. 1 is a perspective view of the device.
Figure 2:
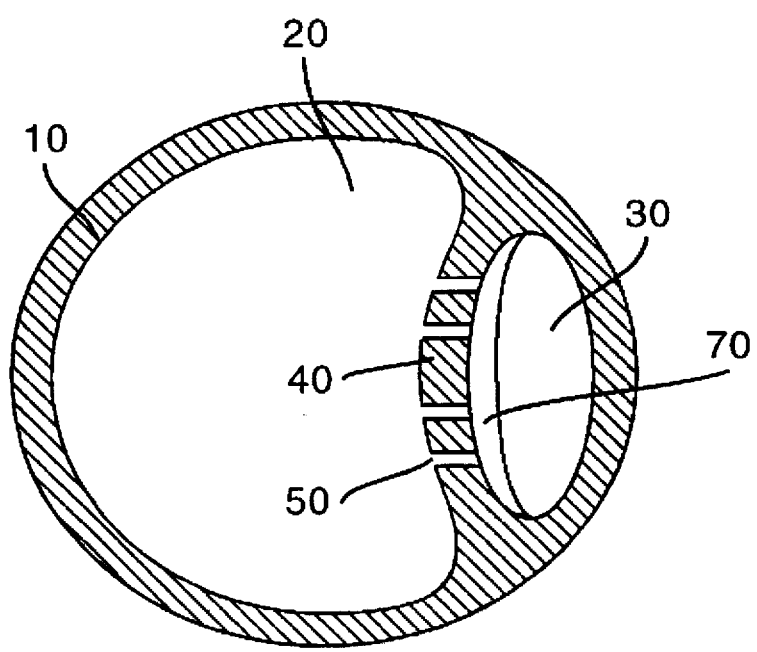
FIG. 2 is a horizontal cross-sectional view of the device.

FIGS. 1 and 2 show the perspective and horizontal cross-sectional drawings of the device of the present invention, of which an opening is designated by the general reference number 10. The device is comprised of a main chamber 20 and an infusion chamber 30. A wall 40 divides the two chambers. Perforations 50 in the upper portion of the wall 40 allow water in the main chamber 20 to mix with tea in the infusion chamber 30 while retaining the tannin rich liquor within the reservoir 60 of the infusion chamber 30. A lip 70 may be present to help retain the tea and tannin rich liquor.

Figure 3A:
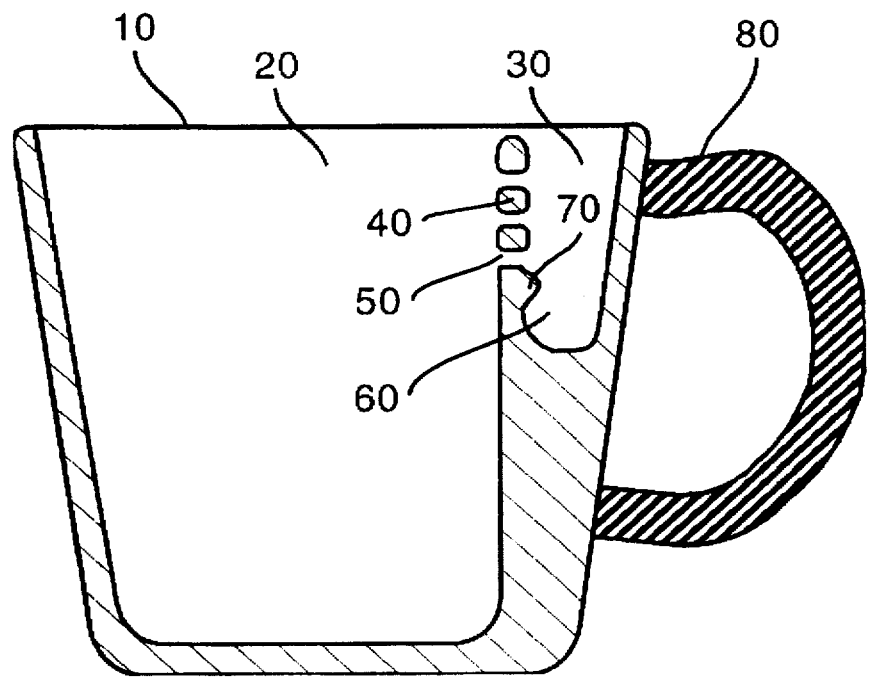
FIG. 3a and FIG. 3b are vertical cross-sectional views of the device in internal configurations, showing the placement of the holes in the wall between first chamber which is the main chamber and the second chamber which is the infusion chamber.
Figure 3B:
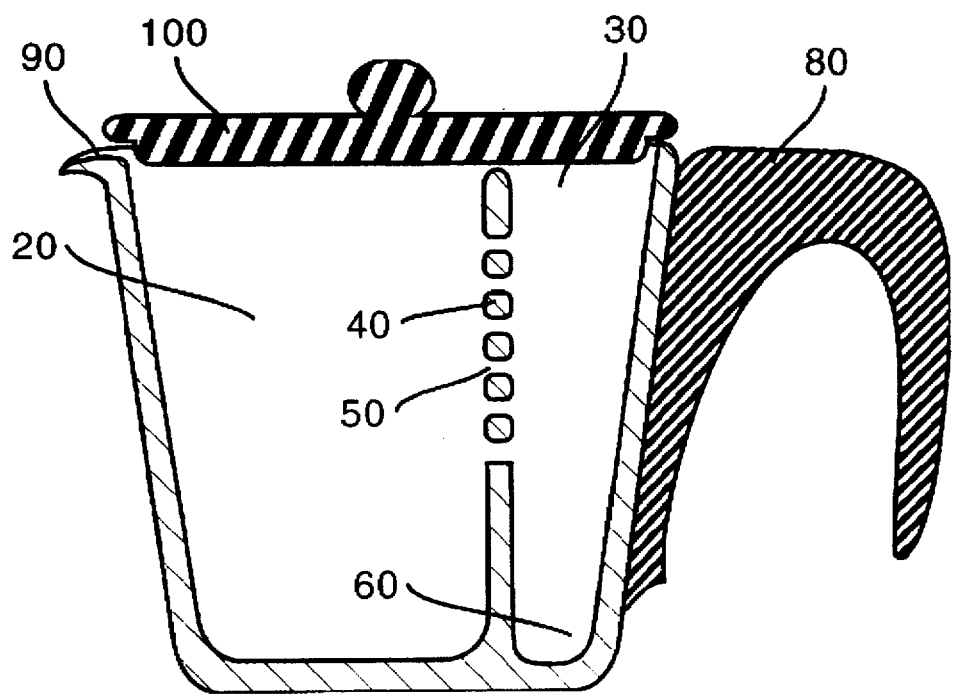

FIG. 3a and FIG. 3b show the vertical cross-sectional views of the invention in handled configurations. The device has an opening 10 and has a main chamber 20 and an infusion chamber 30. A wall 40 divides the two chambers and may extend either the partial or full height of the device. Perforations 50 in the upper portion of the wall 40 filter the tea in the infusion chamber 30 from the liquid in the main chamber 20. A lip 70 may be present to help retain the loose tea and tannin rich liquor inside the reservoir 60 when the device is tilted. A handle 80 may be present to help in handling the device. A spout 90 may be present to help in pouring the liquid out. A cover 100 may be present to help in keeping debris out of the device, and in maintaining temperature control.

Figure 4A:
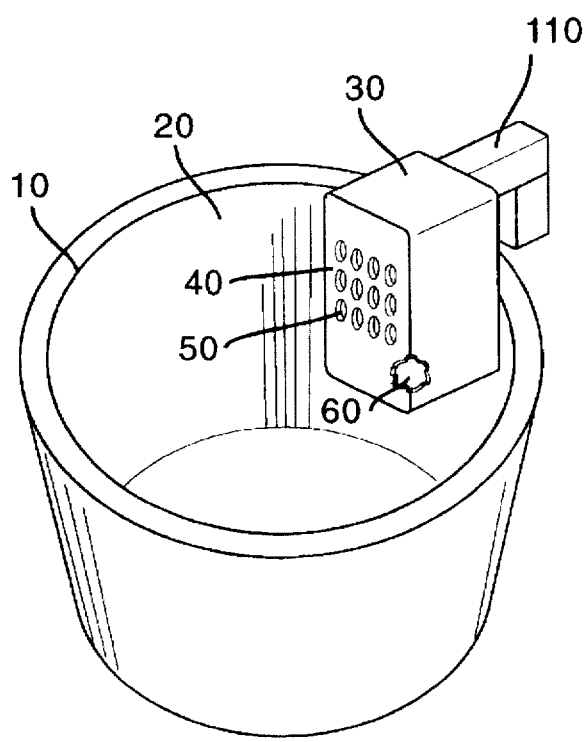
FIG. 4a and FIG. 4b are exploded views of the device in cartridge configurations, showing the infusion chamber as being a removable cartridge and the placement of holes in the appropriate wall of the cartridge.
Figure 4B:
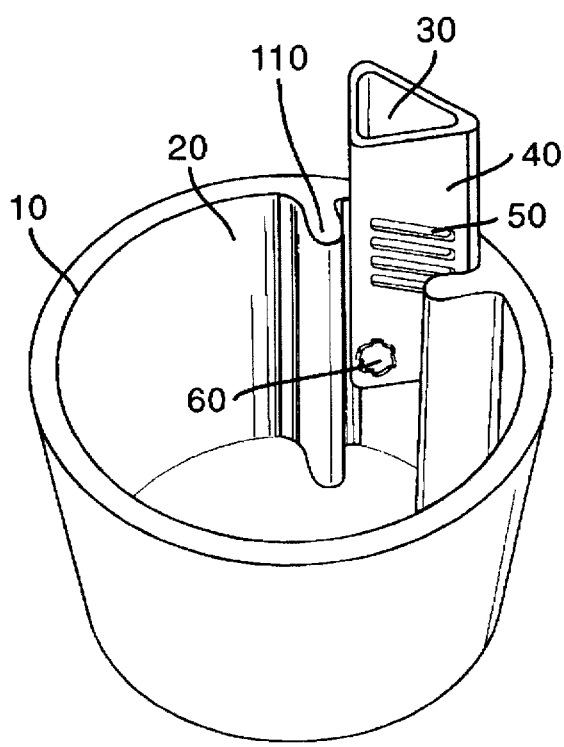

FIG. 4a and FIG. 4b show the invention in cartridge configurations where the infusion chamber 30 is removable. The infusion chamber 30 is placed within the opening 10 and then operates in like manner to the other embodiments. Holders 110 on either the removable infusion chamber 30 or the main chamber 20 secure the cartridge in place. Alternately, the cartridge or the main chamber may be shaped to allow for the securing of the cartridge in place either with or without holders. An embodiment is shown in FIG. 4b of the cartridge being an extruded triangular shape to prevent the cartridge from moving about in the main chamber while the device is tilted.

The advantages of the present invention may now be readily understood. The user may fill the infusion chamber with tea and the main chamber with hot water. Alternately, the present invention may be entirely placed in a microwave oven to heat the water. Further uses include brewing iced tea in the microwave by adding ice cubes instead of water into the main chamber, and adding the tea and sufficient water to cover the tea in the infusion chamber.

After the tea steeps for the appropriate amount of time, the user begins to drink the tea.

As the water level drops in the main chamber, water stops flowing into the infusion chamber. Although tannins continue to be expressed into the water in the reservoir of the infusion chamber, the tannin rich liquor is retained in the infusion chamber and does not contaminate the beverage in the main chamber.

Although the present invention has been described in terms of the presently preferred embodiment, it is to be understood that such disclosure is not to be interpreted as limiting. Various alterations and modifications will no doubt become apparent to those skilled in the art after having read the above disclosure.

Accordingly, it is intended that the appended claims be interpreted as covering all alterations and modifications as fall within the true spirit and scope of the invention.

I claim:

1. An infusion vessel comprising:

a) a beverage containing chamber;

b) an infusion chamber integrally formed along side of said beverage chamber, said infusion chamber consisting of a perforated wall which extends a distance within said beverage chamber and a closed bottom wall, said perforated wall being in fluid contact with an interior of said beverage chamber;

c) wherein fluid within the beverage chamber contacts an infusion product within the infusion chamber to produce a beverage.

2. The device of claim 1 wherein said infusion chamber contains at least one lip placed horizontally on the interior side of said infusion chamber.

* * * * *